United States Patent

[11] 3,592,232

[72] Inventor Arthur L. Good
       Elkhart, Ind.
[21] Appl. No. 823,589
[22] Filed May 12, 1969
[45] Patented July 13, 1971
[73] Assignee Robertshaw Controls Company
       Richmond, Va.

[54] FUEL CONTROL SYSTEM AND PNEUMATICALLY OPERATED VALVE MEANS THEREFOR OR THE LIKE
20 Claims, 2 Drawing Figs.

[52] U.S. Cl. ........................................ 137/614.21
[51] Int. Cl. ....................................... G05d 16/06
[50] Field of Search .............................. 137/614.21,
       525, 614, 484.2, 494, 498

[56] References Cited
UNITED STATES PATENTS

| | | | |
|---|---|---|---|
| 1,548,098 | 8/1925 | Raymond | 137/614.21 |
| 2,036,849 | 4/1936 | Branche | 137/614.21 |
| 2,620,133 | 12/1952 | Obermaier | 137/525 |
| 2,693,823 | 11/1954 | Sogge | 137/614.21 |

Primary Examiner—Laverne D. Geiger
Assistant Examiner—William H. Wright
Attorneys—Candor, Candor & Tassone, Auzville Jackson, Jr. and Robert L. Marben ABSTRACT: A pneumatically operated valve means having a housing means provided with an inlet separated from an outlet by a valve seat means, the valve seat means having a first valve seat leading to one of the inlet and outlet and being controlled by a pressure regulator means and having a second valve seat leading to the other of the inlet and outlet and being controlled by pneumatically operated means. The first and second valve seats are fluidly interconnected together.

PATENTED JUL 13 1971

3,592,232

INVENTOR.
ARTHUR L. GOOD

BY
Caudn, Caudn & Tassone

HIS ATTORNEYS

FUEL CONTROL SYSTEM AND PNEUMATICALLY OPERATED VALVE MEANS THEREFOR OR THE LIKE

This invention relates to an improved fuel control system as well as to an improved pneumatically operated valve means for such a control system or the like.

It is well known that fuel can be supplied to a burner means through a valve means which is adapted to be opened and closed by a pneumatically operated valve means.

One of the features of this invention is to provide an improved pneumatically operated valve means which can control the flow of fuel from a fuel source to a burner means.

In particular, one embodiment of this invention provides a pneumatically operated valve means having a housing means provided with an inlet separated from an outlet by a valve seat means, the valve seat means having a first valve seat leading to one of the inlet and the outlet and a second valve seat leading to the other of the inlet and the outlet. The first and second valve seats are fluidly interconnected together. A pressure regulator means controls the first valve seat so as to control the pressure of the fuel adapted to pass from the inlet to the outlet through the valve seats. A pneumatically operated means controls the opening and closing of the second valve seat so as to control the flow of fuel adapted to pass from the inlet to the outlet through the valve seats.

Accordingly, it is an object of this invention to provide an improved pneumatically operated valve means having one or more of the novel features set forth above or hereinafter shown or described.

Another object of this invention is to provide an improved fuel control system utilizing such a pneumatically operated valve means.

Other objects, uses and advantages of this invention are apparent from a reading of this description which proceeds with reference to the accompanying drawings forming a part thereof and wherein.

Figure 1:
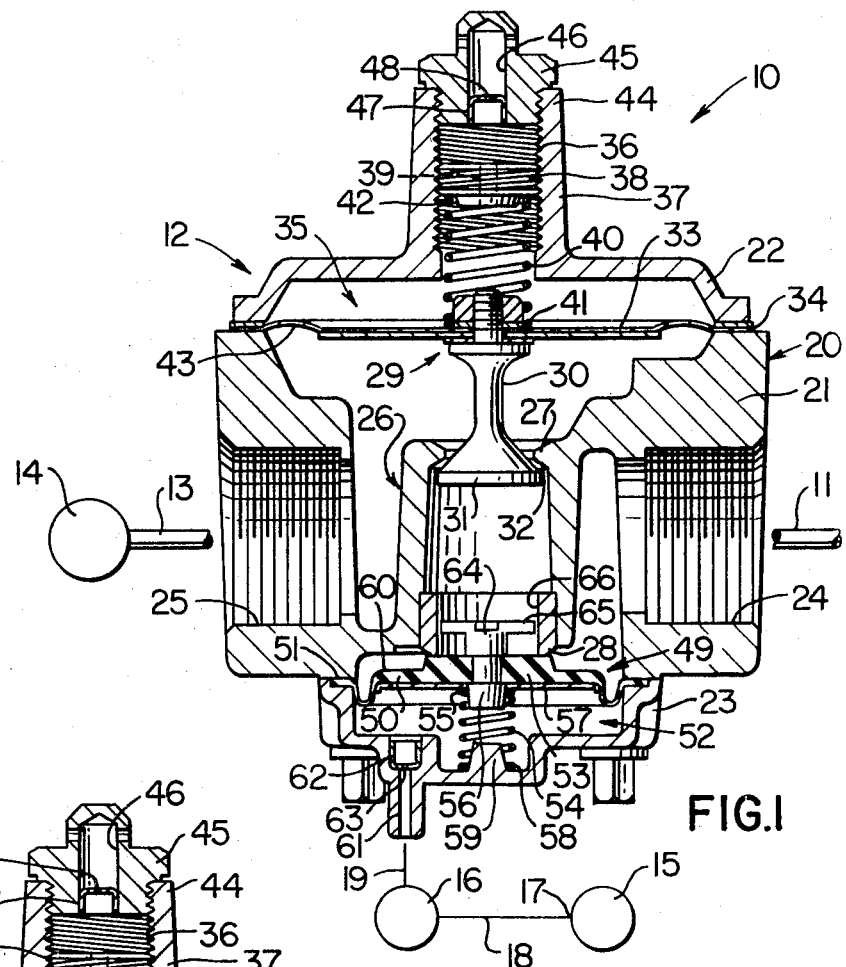
FIG. 1 is a schematic view illustrating the improved fuel control system of this invention, the pneumatically operated valve means of this invention being illustrated in cross section.

While the various features of this invention are hereinafter described and illustrated as being particularly adapted to provide valve means for controlling the flow of fuel to a burner means, it is to be understood that the various features of this invention can be utilized singly or in any combination thereof to provide valve means for other systems as desired.

Therefore, this invention is not to be limited to only the embodiment illustrated in the drawings, because the drawings are merely utilized to illustrate one of the wide variety of uses of this invention.

Figure 2:
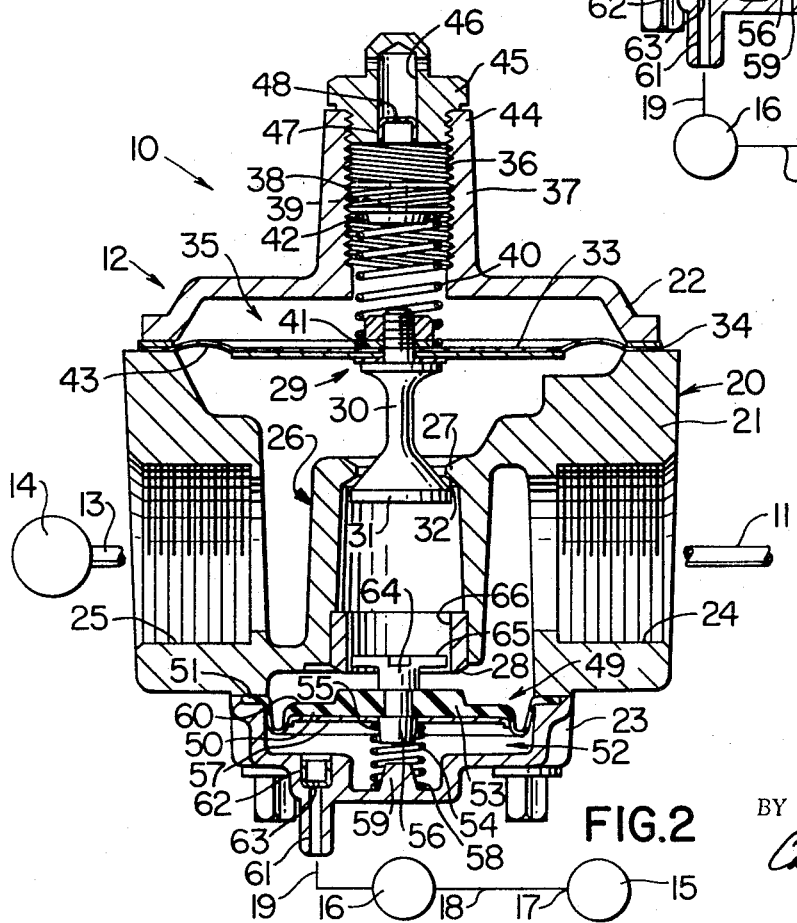
FIG. 2 is a view similar to FIG. 1 and illustrates the pneumatically operated valve means in another operating position thereof.

Referring now to FIGS. 1 and 2, the improved fuel control system of this invention is generally indicated by the reference numeral 10 and comprises a fuel source conduit means 11 adapted to be interconnected by a pneumatically operated valve means 12 of this invention to a conduit means 13 that leads to a burner means 14 in a manner hereinafter described, the system 10 further comprising a pneumatic source 15 and a control means 16 adapted to interconnect the pneumatic source 15 to the pneumatically operated valve means 12 to actuate the same in a manner hereinafter described and to disconnect the pneumatic source 15 from the pneumatically operated valve means 12 to deactivate the same in a manner hereinafter described.

The pneumatic source 15 can comprise a vacuum source, such as a vacuum pump or the like having its inlet 17 interconnected to the control means 16 by a conduit means 18 so that when the control means 16 is in one operating position thereof, the control means 16 fluidly interconnects the conduit 18 to a conduit 19 leading to the pneumatically operated valve means 12. In another position of the control means 16, the control means 16 disconnects the conduit 19 from the conduit 18 while interconnecting the conduit 19 to the atmosphere in a manner well known in the art.

The pneumatically operated valve means 12 comprises a housing means 20 formed from three housing parts 21, 22, and 23 suitably secured together and having an inlet means 24 separated from an outlet means 25 by a valve seat means 26 that has a first valve seat 27 and a second valve seat 28 fluidly interconnected together and disposed in axially aligned relation as illustrated in FIG. 1.

The valve seat 27 is adapted to be controlled by a pressure regulator means 29 that comprises a valve member 30 projecting through the valve seat 27 and having a valve head 31 for controlling the valve seat 27 on the side 32 thereof, the valve member 30 being controlled by a flexible diaphragm 33 having its outer periphery 34 trapped between the housing parts 21 and 22 so as to cooperate with the housing part 22 to define a chamber 35 therewith. The housing part 22 has a threaded bore 36 passing through a tubular extension 37 thereof and threadedly receiving an adjusting member 38 that has an opening 39 passing therethrough. A compression spring 40 is disposed in the chamber 35 and has one end 41 bearing against the flexible diaphragm 33 and the other end 42 thereof bearing against the adjusting member 38 so that the force of the compression spring 40 tends to urge the valve member 30 to its open position. However, the under side 43 of the flexible diaphragm 33 is adapted to be exposed to the fuel pressure passing through the valve seat 27 and leading to the outlet 25 so that the pressure of the fuel in the outlet 25 tends to move the flexible diaphragm 33 upwardly in FIG. 1 in opposition to the force of the compression spring 30 in a manner to tend to close the valve member 31 against the valve seat 27. In this manner, the pressure regulator means 29 to maintain the pressure of the fuel passing from the inlet 24 of the pneumatically operated valve means 12 to the outlet 25 thereof at a predetermined pressure as set by the adjusting member 38 of the pressure regulator means 29 in a conventional manner.

The threaded bore 36 of the housing part 22 has its upper end 44 closed by a threaded retainer 45 having a passage means 46 passing therethrough and being adapted to fluidly interconnect the atmosphere to the chamber 35. However, an orifice cup 47 is disposed in the passage means 46 so as to provide a restricted passage or orifice 48 in the passage means 46 that interconnects the atmosphere to the chamber 35.

The pneumatically operated valve means 12 includes a pneumatically operated means 49 for controlling the second valve seat 28, the pneumatically operated means 49 of this invention comprising a flexible diaphragm 50 having its outer periphery 51 sealing trapped between the housing parts 21 and 23 so as to cooperate with the housing part 23 to define a chamber 52 therebetween. The flexible diaphragm 50 has a thickened central portion 53 adapted to seat against the valve seat 28 so as to close the valve seat 28 and thereby prevent fluid communication from the inlet 24 of the housing means 20 to the outlet 25 thereof.

A compression spring 54 is disposed in the chamber 52 and has one end 55 adapted to be disposed about a frustoconical projection 56 of the flexible diaphragm 50 and bear against a diaphragm backup plate 57 of the diaphragm 50 while the other end 58 of the compression spring 54 is adapted to bear against the housing part 23 and be disposed about a frustoconical projection 59 thereof whereby the compression spring 54 tends to move the flexible diaphragm 50 into seating engagement against the valve seat 28. The force of the compression spring 54 is such that the same maintains the valve member 50 in sealing engagement with the valve seat 28 when the chamber 52 is at atmospheric condition so that the force of the fuel entering the inlet 24 and acting against the side 60 of the flexible diaphragm 50 is insufficient to open the diaphragm 50 away from the valve seat 28 when the chamber 52 is at atmospheric condition.

A passage means 61 is formed in the housing part 23 and leads from the exterior of the housing means 20 to the chamber 52, the passage means 61 having an orifice cup 62 disposed therein and being provided with an orifice or restriction 63 that is adapted to interconnect the exterior of the housing means 20 with the chamber 52 in a manner hereinafter described. However, the conduit 19 leading from the control means 16 is fluidly interconnected to the passage 61 so that the only flow through the orifice cup 62 is provided by the control means 16 in a manner hereinafter described.

The diaphragm 50 of the pneumatically operated means 49 carries a projection 64 which has a disclike end 65 that projects into the valve seat 28 in relatively close proximity to the internal peripheral surface 66 thereof so as to provide a guiding means for the flexible diaphragm 50 relative to the valve seat 28 as will be apparent hereinafter.

Therefore, it can be seen that the pneumatically operated valve means 12 of this invention can be formed in a relatively simple manner from a relatively small number of parts to operate in a manner now to be described.

When the operator or the like has the control means 16 set in a position that prevents fluid communication between the conduits 18 and 19 so that the atmosphere is interconnected to the conduit 19, the chamber 52 of the pneumatically operated valve means 12 is at atmospheric condition so that the force of the compression spring 54 maintains the diaphragm 50 in seating engagement against the valve seat 28 whereby no fuel can flow from the fuel source conduit 11 to burner means 14.

However, when the operator sets the control means 16 to fluidly interconnect the conduit 18 to the conduit 19 and disconnects the atmosphere from the conduit 19, the vacuum source 15 is now interconnected to the chamber 52 of the pneumatically operated means 49 through the orifice cup 62 so that the chamber 52 begins to be evacuated by the vacuum source 15. When the resulting pressure differential acting across the flexible diaphragm 50 exceeds the force of the compression spring 54 tending to maintain the diaphragm 50 against the valve seat 28, the diaphragm 50 moves downwardly from the position illustrated in FIG. 1 to the position illustrated in FIG. 2 to open the valve seat 28 and permit the fuel from the fuel source conduit 11 to pass through the open valve seat 28 and through the valve seat 27 to the outlet 25 and, thus, to the burner means 14 to be ignited in a conventional manner. As long as the vacuum source 15 is maintained in fluid communication with the chamber 52 of the pneumatically operated means 49, the flexible diaphragm 50 remains in its open position as illustrated in FIG. 2 and the pressure regulator means 29 maintains the pressure of the fuel being delivered to the burner means 14 at a predetermined pressure in a conventional manner so that the burner means 14 is supplied fuel as long as the control means 16 is set in an operating position thereof.

Subsequently, should the operator desire to terminate the operation of the burner means 14, the operator changes the position of the control means 16 to disconnect the conduit 18 from the conduit 19 and to interconnect the atmosphere to the conduit 19 so that the chamber 52 of the pneumatically operated means 49 returns to atmospheric condition and the compression spring 54 moves the diaphragm 50 to its closed position against the valve seat 28 and thereby terminates the flow of fuel to the burner means 14.

Such movement of the flexible diaphragm 50 relative to the valve seat 28 is guided by the guide disc 65 carried by the diaphragm 50 so that the thickened central portion 53 thereof will properly seat against the valve seat 28 when the diaphragm 50 is moved to its closed position.

If a rupture should occur through the flexible diaphragm 50 of the pneumatically operated means 49 of this invention, so as to permit fuel at the inlet 24 to pass through such rupture into the chamber 52 and, thus, to the atmosphere through the control means 16 when the control means 16 is set in its off position, the restriction or orifice 63 in the orifice cup 62 prevents any bleed of the fuel to the atmosphere at an adverse rate whereby the orifice cup 62 provides a safety feature for the pneumatically operated valve means 12 of this invention.

While the control means 16 has been described as being manually operated, it is to be understood that the control means 16 can be automatically operated, such as being a temperature sensing device, if desired.

For example, the control means 16 can comprise a bimetallic pneumatic temperature sensing thermostat which will interconnect the vacuum source 15 to the conduit 19 as long as the thermostatically operated means 16 is sensing a temperature below a set temperature of the device 16. However, when the temperature effect of the burner means 14 as sensed by the control means 16 exceeds the set temperature setting of the device 16, the bimetal means of the member 16 will disconnect the vacuum source conduit 18 from the conduit 19 and interconnect the atmosphere to the conduit 19 as in the manner previously described.

Also, the control means 16 can comprise means to manually or automatically vary the degree of interconnection of the vacuum source conduit 18 to the actuator conduit 19 so as to vary the degree of opening of the diaphragm 50 relative to the valve seat 28 to provide for fuel flow modulation to the burner means 14. For example, the control means can comprise an adjustable vacuum regulator or the like.

Therefore, it can be seen that this invention not only provides an improved fuel control system, but also this invention provides an improved pneumatically operated valve means or the like.

What I claim is:

1. A pneumatically operated valve means comprising a housing means having an inlet separated from an outlet by a valve seat means, said valve seat means having a first valve seat leading to one of said inlet and said outlet and a second valve seat leading to the other of said inlet and said outlet, said first and second valve seats being fluidly interconnected together, pressure regulator means controlling said first valve seat so as to control the pressure of the fluid adapted to pass from said inlet to said outlet through said valve seats, said pressure regulator comprising a movable valve member for varying the degree of fluid flow through said first valve seat, said movable valve member being movable between said first and second valve seats, and pneumatically operated means controlling the opening and closing of said second valve seat so as to control the flow of the fluid adapted to pass from said inlet to said outlet through said valve seats.

2. A pneumatically operated valve means as set forth in claim 1 wherein said second valve seat is intermediate said inlet and said first valve seat.

3. A pneumatically operated valve means as set forth in claim 1 wherein said first and second valve seats are in axially aligned relation.

4. A pneumatically operated valve means as set forth in claim 1 wherein a flexible diaphragm is carried by said housing means and defines a chamber therewith, said flexible diaphragm defining said pneumatically operated means for opening and closing said second valve seat.

5. A pneumatically operated valve means as set forth in claim 4 wherein said flexible diaphragm carries a guide member that projects into said second valve seat to guide movement of said diaphragm relative to said second valve seat.

6. A pneumatically operated valve means as set forth in claim 4 wherein spring means is carried by said housing means and is operatively interconnected to said diaphragm to tend to urge said diaphragm to one of its opening and closing positions relative to said second valve seat.

7. A pneumatically operated valve means as set forth in claim 4 wherein said chamber is interconnected to the exterior of said housing means by a passage means formed in said housing means.

8. A pneumatically operated valve means as set forth in claim 7 wherein a restriction means is disposed in said passage means that leads to said chamber.

9. A pneumatically operated valve means as set forth in claim 1 wherein said pneumatically operated means is vacuum operated and comprises a flexible diaphragm carried by said housing means and defining a chamber therewith on one side of said diaphragm, said flexible diaphragm having the other side thereof for opening and closing said second valve seat with said other side being subjected to the pressure at said inlet and said outlet when said other side is closing said second valve seat.

10. A pneumatically operated valve means as set forth in claim 1 wherein said pressure regulator means has a flexible diaphragm operatively interconnected to said movable valve member for controlling movement of said valve member relative to said first valve seat.

11. In a fuel control system having a source of fuel, a burner means and a pneumatic source, the improvement comprising a pneumatically operated valve means having a housing means provided with an inlet separated from an outlet by a valve seat means, means interconnecting said fuel source to said inlet, means interconnecting said burner means to said outlet, said valve seat means having a first valve seat leading to one of said inlet and said outlet and a second valve seat leading to the other of said inlet and said outlet, said first and second valve seats being fluidly interconnected together, pressure regulator means controlling said first valve seat so as to control the pressure of the fuel passing from said inlet to said outlet through said valve seats, said pressure regulator comprising a movable valve member for varying the degree of fluid flow through said first valve seat, said movable valve member being movable between said first and second valve seats, pneumatically operated means controlling the opening and closing of said second valve seat to control the flow of the fuel passing from said inlet to said outlet through said valve seats, and control means for interconnecting said pneumatic source to said pneumatically operated means to actuate the same to open said second valve seat and to disconnect said pneumatic source from said pneumatically operated means to deactuate the same to close said second valve seat.

12. In a fuel control system as set forth in claim 11, the further improvement wherein said second valve seat is intermediate said inlet and said first valve seat.

13. In a fuel control system as set forth in claim 11, the further improvement wherein said first and second valve seats are in axially aligned relation.

14. In a fuel control system as set forth in claim 11, the further improvement wherein a flexible diaphragm is carried by said housing means and defines a chamber therewith, said flexible diaphragm defining said pneumatically operated means for opening and closing said second valve seat, said control means being adapted to interconnect and disconnect said pneumatic source to and from said chamber.

15. In a fuel control system as set forth in claim 14, the further improvement wherein said flexible diaphragm carries a guide member that projects into said second valve seat to guide movement of said diaphragm relative to said second valve seat.

16. In a fuel control system as set forth in claim 14, the further improvement wherein spring means is carried by said housing means and is operatively interconnected to said diaphragm to tend to urge said diaphragm to one of its opening and closing positions relative to said second valve seat.

17. In a fuel control system as set forth in claim 14, the further improvement wherein said chamber is interconnected to the exterior of said housing means by a passage means formed in said housing means, said control means being interconnected to said passage means.

18. In a fuel control system as set forth in claim 17, the further improvement wherein a restriction means is disposed in said passage means that leads to said chamber.

19. In a fuel control system as set forth in claim 11, the further improvement wherein said pneumatically operated means is vacuum operated and comprises a flexible diaphragm carried by said housing means and defining a chamber therewith on one side of said diaphragm, said flexible diaphragm having the other side thereof for opening and closing said second valve seat with said other side being subjected to the pressure at said inlet and said outlet when said other side is closing said second valve seat.

20. In a fuel control system as set forth in claim 11, the further improvement wherein said pressure regulator means has a flexible diaphragm operatively interconnected to said movable valve member for controlling movement of said valve member relative to said first valve seat.